US012044553B2

(12) United States Patent
Rosenegger et al.

(10) Patent No.: US 12,044,553 B2
(45) Date of Patent: Jul. 23, 2024

(54) SCANNING UNIT FOR AN ANGLE-MEASURING DEVICE

(71) Applicant: Dr. Johannes Heidenhain GmbH, Traunreut (DE)

(72) Inventors: Gregor Rosenegger, Uebersee (DE); Andreas Mitterer, Haag (DE); Christian Funk, Rosenheim (DE); Erich Strasser, Trostberg (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 500 days.

(21) Appl. No.: 16/744,213

(22) Filed: Jan. 16, 2020

(65) Prior Publication Data
US 2020/0232820 A1    Jul. 23, 2020

(30) Foreign Application Priority Data

Jan. 17, 2019  (EP) .................................. 19152247

(51) Int. Cl.
*G01B 7/30*    (2006.01)
*F16C 19/22*   (2006.01)
(Continued)

(52) U.S. Cl.
CPC ........... *G01D 5/2053* (2013.01); *F16C 19/22* (2013.01); *G01B 7/30* (2013.01); *G01B 21/22* (2013.01);
(Continued)

(58) Field of Classification Search
CPC .... F16C 41/007; F16C 11/04; F16C 2350/26; F16C 2233/00; F16C 19/22;
(Continued)

(56) References Cited

U.S. PATENT DOCUMENTS

| 6,111,402 A | 8/2000 | Fischer |
| 2006/0244439 A1 | 11/2006 | Fukuoka et al. |

(Continued)

FOREIGN PATENT DOCUMENTS

| DE | 19546865 C1 | 10/1996 |
| DE | 102008046741 A1 | 3/2010 |

(Continued)

OTHER PUBLICATIONS

Definition of Flush, obtained from a Google.com search based on Oxford Languages, obtained on Nov. 5, 2022.*

*Primary Examiner* — David M Schindler
(74) *Attorney, Agent, or Firm* — LEYDIG, VOIT & MAYER, LTD.

(57) ABSTRACT

A scanning unit for determining a relative angular position of an angular scale that is rotatable about an axis relative to the scanning unit includes a circuit board and evaluation electronics. A detector assembly is disposed in a manner that enables scanning of the angular scale. A contact carrier encloses electrical contacts for creating a plug-and-socket connection. The contact carrier has an outer wall and is mounted on the circuit board such that the electrical contacts extend in a direction having an axial component. A housing body is provided with an opening having an inner wall. A first elastic element is disposed under radial preload such that the contact carrier is centered with respect to the inner wall of the opening. The circuit board is torsionally rigidly attached to the housing body such that the circuit board is radially spaced therefrom by a first gap.

17 Claims, 4 Drawing Sheets

(51) Int. Cl.
*G01B 21/22* (2006.01)
*G01D 5/14* (2006.01)
*G01D 5/20* (2006.01)
*G01D 5/244* (2006.01)

(52) U.S. Cl.
CPC .............. *G01D 5/145* (2013.01); *G01D 5/244* (2013.01); *G01D 5/24442* (2013.01)

(58) Field of Classification Search
CPC ........ G01D 11/245; G01D 5/145; G01D 5/16; G01D 5/165; G01D 5/20; G01D 5/2006; G01D 5/202; G01D 5/2026; G01D 5/204; G01D 5/2053; G01D 5/206; G01D 5/2066; G01D 5/2073; G01D 5/2086; G01D 5/22; G01D 5/2208; G01D 5/2225; G01D 5/2233; G01D 5/225; G01D 5/2275; G01D 5/2283; G01D 5/2291; G01D 5/24442; E02F 9/006; G01B 21/22; G01B 7/30; G01R 33/0047; G01R 33/07; G01R 33/072; G01R 33/09; G01R 33/091
See application file for complete search history.

(56) References Cited

U.S. PATENT DOCUMENTS

| | | | |
|---|---|---|---|
| 2007/0151322 A1* | 7/2007 | Steinich | G01D 5/04 |
| | | | 702/151 |
| 2008/0289838 A1 | 11/2008 | Niarfeix et al. | |
| 2011/0169482 A1 | 7/2011 | Tiemann | |
| 2012/0168629 A1 | 7/2012 | Santos et al. | |
| 2012/0169325 A1* | 7/2012 | Iwahashi | G01D 11/245 |
| | | | 324/207.25 |
| 2016/0290836 A1* | 10/2016 | Suma | G01D 11/245 |
| 2017/0248449 A1* | 8/2017 | Kareco | G01L 19/147 |
| 2018/0023469 A1 | 1/2018 | Osawa et al. | |

FOREIGN PATENT DOCUMENTS

| | | |
|---|---|---|
| EP | 0845659 A2 | 6/1998 |
| EP | 2472235 A2 | 7/2012 |

* cited by examiner

SCANNING UNIT FOR AN ANGLE-MEASURING DEVICE

CROSS-REFERENCE TO PRIOR APPLICATIONS

Priority is claimed to European Patent Application No. EP 19 152 247.3, filed on Jan. 17, 2019, the entire disclosure of which is hereby incorporated by reference herein.

FIELD

Angle-measuring devices are used, for example, in rotary encoders to determine the angular position of two relatively rotatable machines parts.

BACKGROUND

In scanning units of inductive angle-measuring devices, it is common to apply excitation coils and receiver coils in the form of conductive traces to a common circuit board that is fixedly attached to, for example, a stator of a rotary encoder. Located opposite this circuit board is a further component which has an angular scale in the form of electrically conductive regions formed thereon at periodic intervals as a graduation structure and which is non-rotatably connected to the rotor of the rotary encoder. When an electric excitation field is applied to the excitation coils, then angular-position-dependent output signals are generated in the receiving coils during relative rotation between rotor and stator. These output signals are then further processed in evaluation electronics.

A fundamental distinction is made between angle-measuring devices with integral bearings and angle-measuring devices without integral bearings, hereinafter referred to as bearingless angle-measuring devices. Angle-measuring devices with integral bearing typically have relatively small rolling-element bearings, so that the relatively rotatable component groups are disposed in a defined axial and radial position relative to each other within the respective angle-measuring device. In contrast, in the case of bearingless angle-measuring devices, care must be taken to ensure that the relatively rotatable component groups are fixed in the correct position, in particular at the correct axial distance relative to one another, while being mounted on a machine.

The Applicant's German Patent Application DE 10 2008 046 741 A1 describes an angle-measuring device having a scanning unit with a connector. Furthermore, EP 0 845 659 A2 describes a scanning unit that is attached to a drive mechanism.

SUMMARY

In an embodiment, the present invention provides a scanning unit for determining a relative angular position of an angular scale that is rotatable about an axis relative to the scanning unit. The scanning unit includes a circuit board having a first surface and a second surface, as well as evaluation electronics. A detector assembly is disposed in a manner that enables scanning of the angular scale located opposite the first surface of the circuit board. A contact carrier encloses electrical contacts for creating a plug-and-socket connection. The contact carrier has an outer wall and is mounted on the second surface of the circuit board such that the electrical contacts extend in a direction having an axial component. A housing body is provided with an opening having an inner wall, the contact carrier extending into the opening. A first elastic element is disposed under radial preload between the inner wall of the opening and the outer wall of the contact carrier such that the contact carrier is centered with respect to the inner wall of the opening. The circuit board is torsionally rigidly attached to the housing body such that the circuit board is radially spaced from the housing body by a first gap.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

In an embodiment, the present invention provides a scanning unit for an, in particular bearingless, inductive angle-measuring device which scanning unit can be precisely manufactured with relatively little effort.

Accordingly, an embodiment of the present invention encompasses a scanning unit for determining a relative angular position of an angular scale that is rotatable about an axis relative to the scanning unit. The scanning unit includes a circuit board having a first surface and a second surface. The scanning unit further includes at least one detector assembly which is disposed in manner that enables scanning of the angular scale located axially opposite the first surface of the circuit board. The scanning unit also includes evaluation electronics, which is typically composed of a plurality of electronic components and often has an integrated circuit (ASIC component). In addition, the scanning unit has a contact carrier which encloses electrical contacts for creating a plug-and-socket connection and which is mounted on the second surface of the circuit board, so that the contacts extend in a direction having an axial component. In particular, the contact carrier has a cylindrical outer wall whose axis of symmetry is the axis around which the angular scale is rotatable. Finally, the scanning unit includes a housing body with an opening having an inner wall. The contact carrier extends into the opening, a first elastic element being disposed under radial preload between the inner wall of the opening and the outer wall of the contact carrier, so that the contact carrier is centered with respect to the inner wall of the opening. The circuit board is torsionally rigidly attached to the housing body such that it is radially spaced therefrom by a first gap.

The detector assembly may be mounted, for example, on the first surface of the circuit board. If the detector assembly is embodied as one or a plurality of receiver windings or as magnetoresistive conductive traces, the detector assembly may also have disposed thereon a thin layer which in particular has insulating properties and provides mechanical protection. The detector assembly is capable of generating angle-dependent output signals, which can be further processed in the evaluation electronics. Angle-dependent output signals are in particular signals which contain information about the relative angular position between the angular scale and the scanning unit.

In an embodiment of the present invention, the first gap is filled with an adhesive.

Advantageously, the first elastic element takes the form of an O-ring which is disposed centrally with respect to the axis and which, in particular, is deformed due to the radial preload.

Advantageously, the circuit board is torsionally rigidly attached to the housing body such that it is axially spaced therefrom by a second gap, which second gap may also be filled with an adhesive.

In an embodiment of the present invention, the outer wall of the contact carrier is geometrically shaped as a cylindrical shell.

Furthermore, the opening may have a rotationally symmetric inner surface, the above-mentioned axis being the axis of symmetry of the inner surface. For example, the inner surface may be the inner contour of a hollow cylinder.

Advantageously, the housing body has a bottom. Furthermore, the circuit board is mounted to the housing body in such a way that the evaluation electronics; i.e., electronic components of the evaluation electronics are located between the bottom and the circuit board. In this case, the bottom may have a hole in which is mounted a sleeve to receive the contact carrier. A particularly economical design can be achieved by using a standardized housing coupling as the sleeve. In a possible alternative design, no additional component is used, so that the contact carrier extends directly into a (threaded) hole in the bottom.

Advantageously, a second elastic element, which may in particular take the form of an O-ring, is provided between the sleeve and hole.

Advantageously, the housing body has slots extending circumferentially about the axis and lands extending axially and circumferentially between two slots. In particular, the slots and lands are configured such that the housing body is axially flexible but torsionally and radially rigid. Moreover, the bottom is disposed axially between the slots and the circuit board, so that in particular the evaluation electronics is accommodated in a protected position between the slots and the circuit board.

In the following, the term "lands" is used to refer to the land- or strip-shaped regions of the housing body that run or extend with an axial directional component. Each land is located between two slots, so that, in particular in the circumferential direction, a slot is disposed on each side of a land.

The housing body is torsionally rigid, which means that it does not deform, or deforms only to an extremely small extent, in response to the introduction of tangentially directed forces. In addition, the housing body may be rigid in a radial direction.

Advantageously, the scanning unit has lands with a slot disposed axially therebetween, so that these lands are axially offset from one another. In particular, the respective lands may be disposed in alignment with one another; i.e., such that they are not offset from one another in the circumferential direction.

In an embodiment of the present invention, the scanning unit has a first pair of lands, the lands of this first pair being offset from one another in the circumferential direction. For example, the lands may be offset by 180° or 120° in the circumferential direction. With regard to the definition of the offset angle, which is in particular a central angle about axis A, the center of a land (with respect to the circumferential direction) may in each case be taken as a reference line.

Advantageously, the scanning unit has a first pair of lands, these lands being disposed in a geometric plane whose normal vector is oriented parallel to the axis.

Furthermore, the scanning unit may have a second pair of lands. In this case, the lands of the first pair may be axially offset relative to the lands of the second pair. In addition, the lands of the first pair may be offset in the circumferential direction relative to the lands of the second pair. Advantageously, the lands of the first pair are each offset by the same angle relative to respective lands of the second pair in the circumferential direction. In particular, the respective lands may be offset from one another by 60° or by 72° or by 90° or by 120°.

In an embodiment of the present invention, the scanning unit has a first pair of slots. Advantageously, the scanning unit then has a second pair of slots, the slots of the first pair being axially offset relative to the slots of the second pair. In particular, the slots of the first pair may be offset in the circumferential direction relative to the slots of the second pair.

Advantageously, at least one of the slots extends over a circumferential angle of at least 70°, in particular over a circumferential angle of at least 100° or at least 140°. It is also advantageous if all slots extend over a circumferential angle of the same magnitude or if at least the slots of a pair extend over a circumferential angle of the same magnitude.

The term "pair" means a group of two elements; i.e., here two slots or two lands. This wording does not rule out the possibility that the respective regions of the housing body may have one or more further such elements (slot, land) in addition to the two elements.

Advantageously, the housing body is elastically deformable in the direction of the axis over a range of at least 0.5 mm, in particular at least 1.0 mm, and preferably at least 1.5 mm.

Advantageously, the housing body has a stop surface having a normal which has a directional component parallel to the axis. The object of this is in particular to allow the housing body to rest axially against the stop surface.

Advantageously, the housing body is designed such that the bottom and the lands are monolithically formed from a single piece; i.e., machined out of a single piece. For example, the entire housing body may be monolithically formed or include at least one monolithic sub-body including the bottom and the lands as integral parts thereof.

The angle-measuring device may be designed as an inductive angle-measuring device or may be based on an optical, magnetic or capacitive principle. Furthermore, the angle-measuring device, which has an angular scale, a scanning unit and evaluation electronics, is preferably designed as a bearingless angle-measuring device.

Advantageous embodiments of the present invention will be apparent from the dependent claims.

Other details and advantages of the scanning unit according to the present invention will be apparent from the following description of two exemplary embodiments, taken in conjunction with the accompanying drawings.

Figure 1:
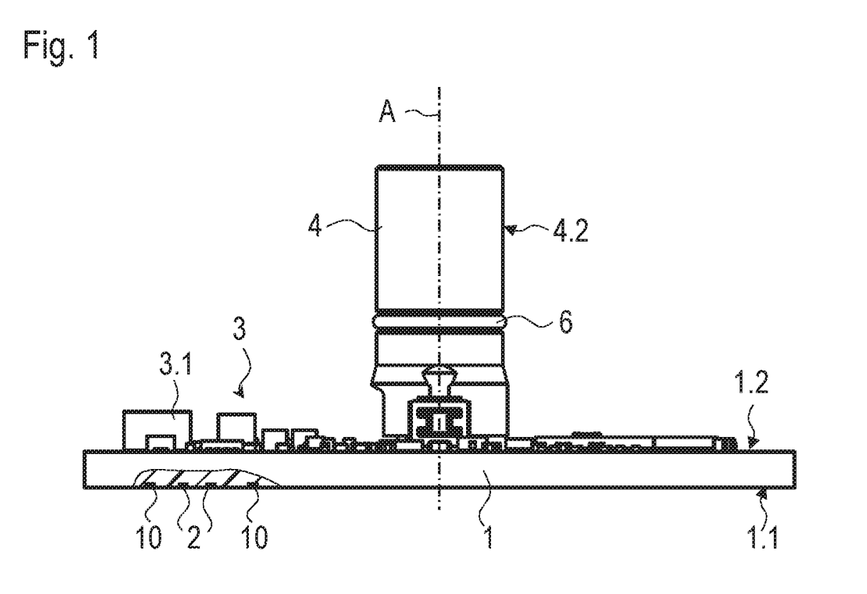
FIG. 1 is a side view showing a circuit board with a contact carrier as part of the scanning unit.
Figure 2:
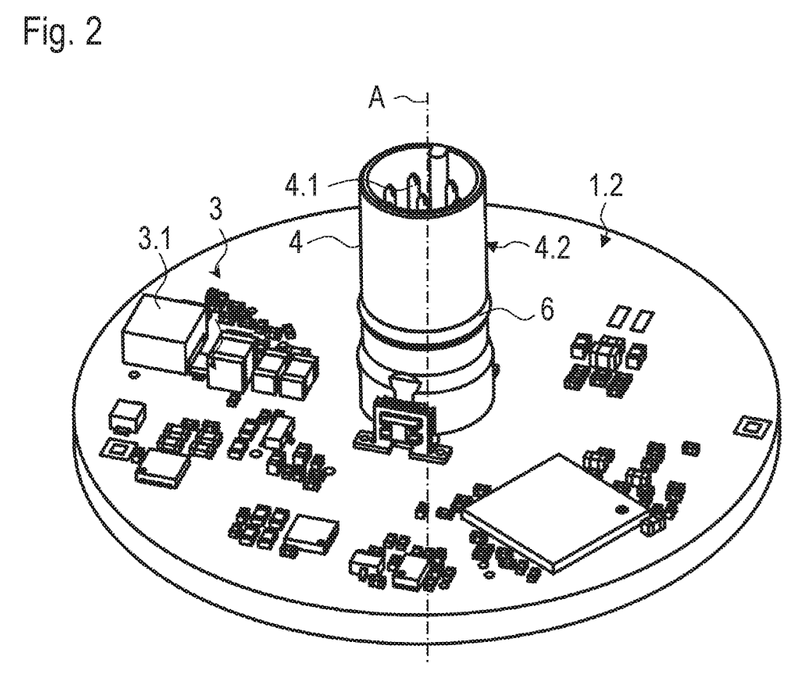
FIG. 2 is a perspective view showing the circuit board with the contact carrier.

A portion of a scanning unit intended for use in an angle-measuring device is shown in a side view in FIG. 1 and in a perspective view in FIG. 2. Accordingly, the scanning unit includes, among other things, a disc-shaped or circular circuit board 1 on the basis of a rigid, fiberglass-reinforced epoxy resin. Circuit board 1 naturally has a first surface 1.1 and a second surface 1.2 opposite the first surface 1.1. In the exemplary embodiment presented here, the scanning unit is based on an inductive measurement principle. Accordingly, a detector assembly 2 disposed on first surface 1.1 is embodied as a plurality of receiver windings. Also disposed on first surface 1.1 are a plurality of excitation traces 10.

Second surface 1.2 has mounted thereon, among other things, electronic components 3.1 of evaluation electronics 3. A contact carrier 4 is also mounted on second surface 1.2 of circuit board 1, for example with the aid of surface-mount technology (SMT). Contact carrier 4 encloses electrical contacts 4.1 (FIG. 2) suitable for creating a plug-and-socket connection, the contacts 4.1 extending in a direction parallel to an axis A. Contact carrier 4 has an outer wall 4.2 or outer surface which geometrically corresponds substantially to a cylindrical curved surface. Outer wall 4.2 has a circumferential groove in which is disposed a first elastic element 6, here an O-ring.

Figure 3:
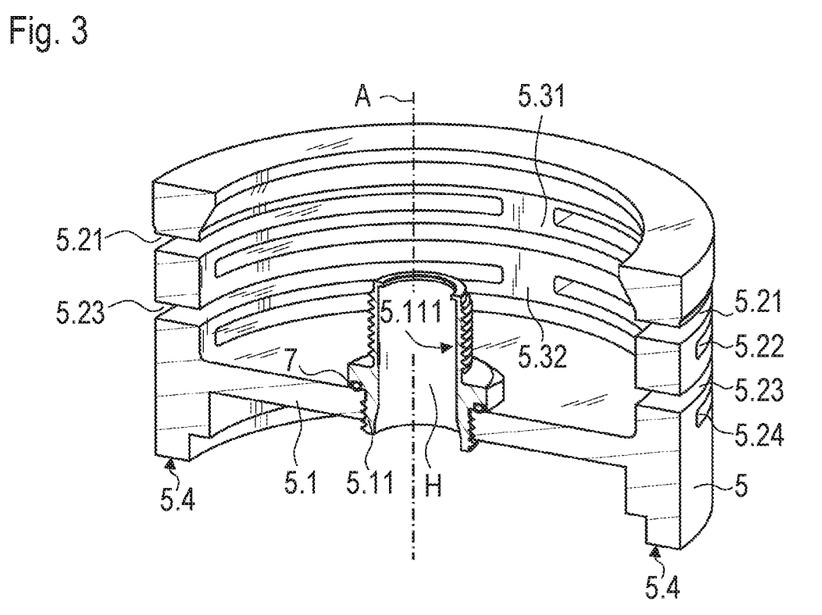
FIG. 3 is a cross-sectional view showing a housing body.

The scanning unit further has a housing body 5, as shown, for example, in FIG. 3. Housing body 5 includes a bottom 5.1 disposed within and integrally formed with a rigid annular portion of housing body 5. The bottom has a hole centrally formed therein with respect to axis A, the hole having a sleeve 5.11 threadedly received therein. A second elastic element 7 is disposed axially between a flange of sleeve 5.11 and bottom 5.1. Here, second elastic element 7 is also embodied as an O-ring. Sleeve 5.11 has a through-opening H and, accordingly, an inner wall 5.111. Inner wall 5.111 has a concave hollow-cylindrical geometry whose axis of symmetry is axis A. Housing body 5 has a substantially hollow-cylindrical shape axially on both sides of bottom 5.1. Housing body 5 further has a machined stop surface 5.4 at an annular end face thereof.

In the exemplary embodiment presented here, to allow for axial deformation of housing body 5, a plurality of slots 5.21, 5.22, 5.23, 5.24 are machined into the housing body 5, each over a respective portion of its circumference. These extend radially completely through the wall of housing body 5, as can be seen, for example, in FIGS. 3 and 4 in the regions between the hatched cross-sectional areas. Axially extending lands 5.31, 5.32, 5.33, 5.34 are located between these slots 5.21, 5.22, 5.23, 5.24 in the circumferential direction. Slots 5.21, 5.22, 5.23, 5.24 may be created, in particular, by a sawing process, leaving the axially extending lands 5.31, 5.32, 5.33, 5.34. Housing body 5 is then configured such that the non-removed regions have a meandering shape. Accordingly, lands 5.31, 5.32, 5.33, 5.34 are those regions of the remaining material which extend in a direction having an axial component.

Slots 5.21, 5.22, 5.23, 5.24 can be grouped into pairs. In the figures, slots whose reference numerals have the same last digit are part of a pair (thus, there are always two slots with the same reference numeral). In the exemplary embodiment presented here, housing body 5 has four pairs of slots 5.21, 5.22, 5.23 and 5.24, respectively.

For example, a first pair of slots has the slots 5.21, which are arranged symmetrically about a point on axis A. The same holds for slots 5.22, which can be considered as being part of a second pair of slots, and for the third and fourth pairs.

Figure 5:
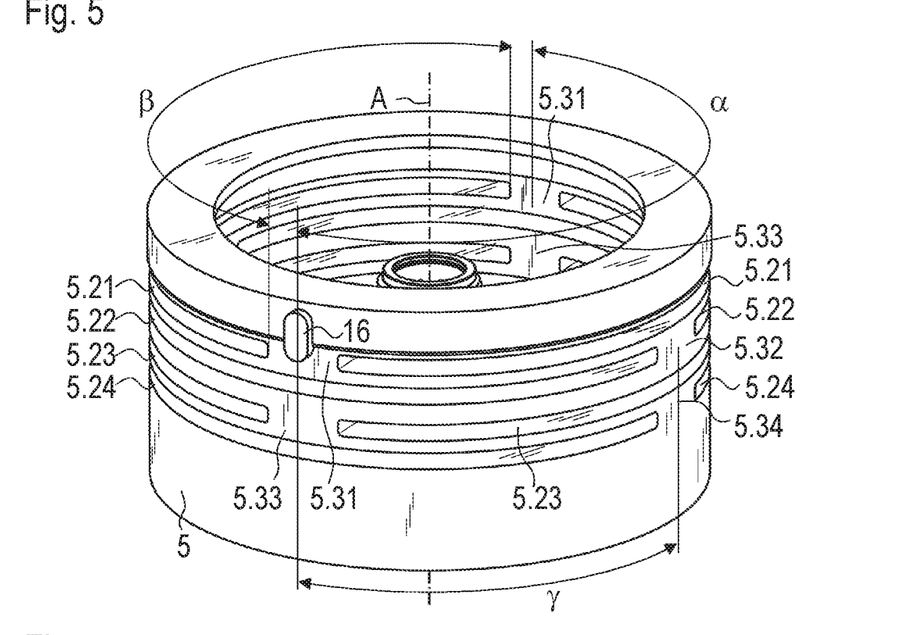
FIG. 5 is a perspective view showing the scanning unit.

As can be seen from FIG. 5, the slots 5.21 of the first pair of slots are here axially offset from the slots 5.22 of the second pair of slots and circumferentially offset therefrom by about 90°.

Slots 5.21, 5.22, 5.23, 5.24 extend over a circumferential angle β of about 170°.

The slots 5.21 of the first pair of slots are located in a first geometric plane and the slots 5.22 of the second pair of slots are located in a second geometric plane that is axially offset from the first geometric plane. Both the first geometric plane and the second geometric plane are arranged such that the respective normal vector of the respective plane is oriented parallel to axis A. In the exemplary embodiment presented here, the same considerations apply also to the third and fourth pairs of slots 5.23; 5.24.

Similarly, lands 5.31, 5.32, 5.33, 5.34 can be grouped into four pairs. Here, housing body 5 has a total of eight lands 5.31, 5.32, 5.33, 5.34, of which six are visible in FIG. 5. A first pair of lands includes the lands 5.31, which are arranged symmetrically about a point on axis A. The lands 5.31 of the first pair are offset from one another by an angle α=180° in the circumferential direction. The same holds for lands 5.32, which can be considered as being part of a second pair of lands, and for the lands 5.33, 5.34 of the third and fourth pairs. The lands 5.31 of the first pair of lands are axially offset from the lands 5.32 of the second pair of lands and circumferentially offset therefrom by a circumferential angle γ, here 90°. In the exemplary embodiment presented here, four pairs of lands 5.31, 5.32, 5.33, 5.34 are axially offset from one another. Here, the lands 5.31, 5.33 of the first and third pairs are offset from the lands 5.32, 5.34 of the second and fourth pairs by the same circumferential angle γ.

Furthermore, housing body 5 is configured to have a first pair of lands, whose lands 5.31 are disposed in an imaginary plane whose normal vector is oriented parallel to axis A. In other words, axis A orthogonally intersects the aforesaid plane. The same considerations apply also to the lands 5.32 of the second pair of lands, the plane in which these lands 5.32 are located being axially offset from the respective plane of the first pair of lands.

The scanning unit has lands 5.31, 5.32, 5.33, 5.34 with a slot 5.21, 5.22, 5.23, 5.24 disposed axially therebetween, so that these lands 5.31, 5.32, 5.33, 5.34 are axially offset from one another. In particular, slot 5.22 is disposed between the aligned and axially offset lands 5.31, 5.33. Similarly, slot 5.23 is disposed between the aligned and axially offset lands 5.32, 5.34.

In the exemplary embodiment presented here, housing body 5 is formed as a single piece or component, except for sleeve 5.11. In particular, housing body 5 is made from an aluminum material.

Figure 4:
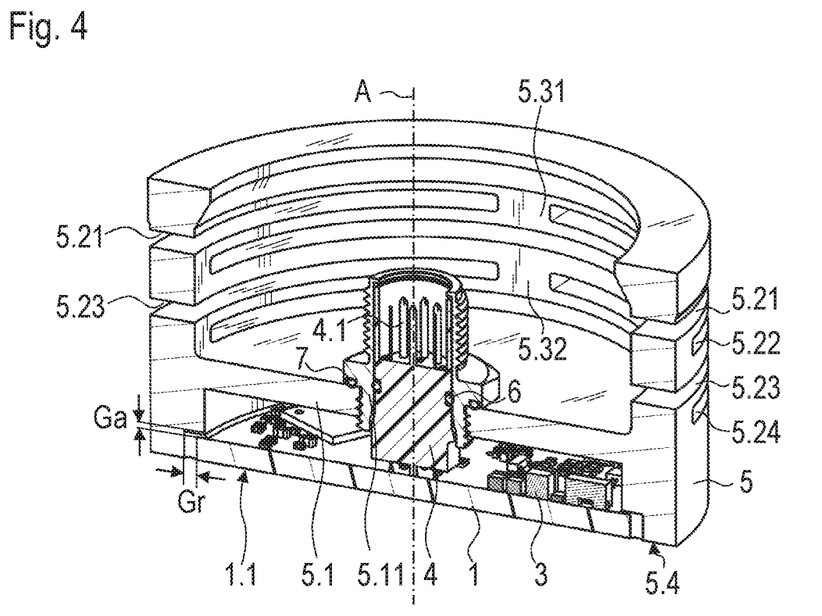
FIG. 4 is a cross-sectional view showing a housing body with the circuit board and the contact carrier.

During assembly of the scanning unit, circuit board 1, together with contact carrier 4 and first elastic element 6, is assembled with housing body 5, forming an assembly such as is shown, for example, in FIG. 4. Elastic element 6 is disposed between inner wall 5.111 of opening H and outer wall 4.2 of contact carrier 4 under radial preload; i.e., such that it is radially compressed. This preload causes contact carrier 4 to be centered with respect to inner wall 5.111 of opening H without further action. Due to the design of housing body 5 and the dimensioning of circuit board 1, circuit board 1 is radially spaced from housing body 5 by a first gap Gr (FIG. 4).

To ensure accurate operation of the entire angle-measuring device, it is not only important that the circuit board 1 with detector assembly 2 be centered with respect to axis A, but it is also important in this connection to establish a defined axial position of circuit board 1. In the exemplary embodiment presented here, first surface 1.1 of circuit board 1 is mounted flush with stop surface 5.4 of housing body 5.

To this end, initially, circuit board 1 is pushed into housing body 5 as far as possible; i.e., as far as it will go. Then, an adhesive 8 is introduced into circumferential gap Gr. Subsequently, stop surface 5.4 is pressed onto a plane surface. Then, contact carrier 4 is moved relative to opening H until circuit board 1 contacts the plane surface and the above-mentioned flush arrangement is obtained. In this connection, it may be advantageous to press contact carrier 4 toward circuit board 1 using an auxiliary mounting tool. In this position, second surface 1.2 of circuit board 1 does not contact housing body 5, but rather an axial second gap Ga is present, as a result of which the not yet cured adhesive 8 creeps into this second gap Ga due to capillary effects. Due to the axial preloading of housing body 5 and the axial compressive force on contact carrier 4, it is ensured that circuit board 1 and stop surface 5.4 remain in an exactly flush position. Thus, in this phase, first gap Gr and second gap Ga are filled with an adhesive 8 (FIG. 6), the adhesive 8 subsequently being cured, for example, in a heating furnace. After curing of adhesive 8, circuit board 1 is rigidly and, in particular, torsionally rigidly attached to housing body 5, so that the axial preloading of housing body 5 now can be removed. Thus, electronic components 3.1 are effectively shielded from external influences, such as from ingress of lubricants or moisture, as well as from mechanical influences.

Figure 6:
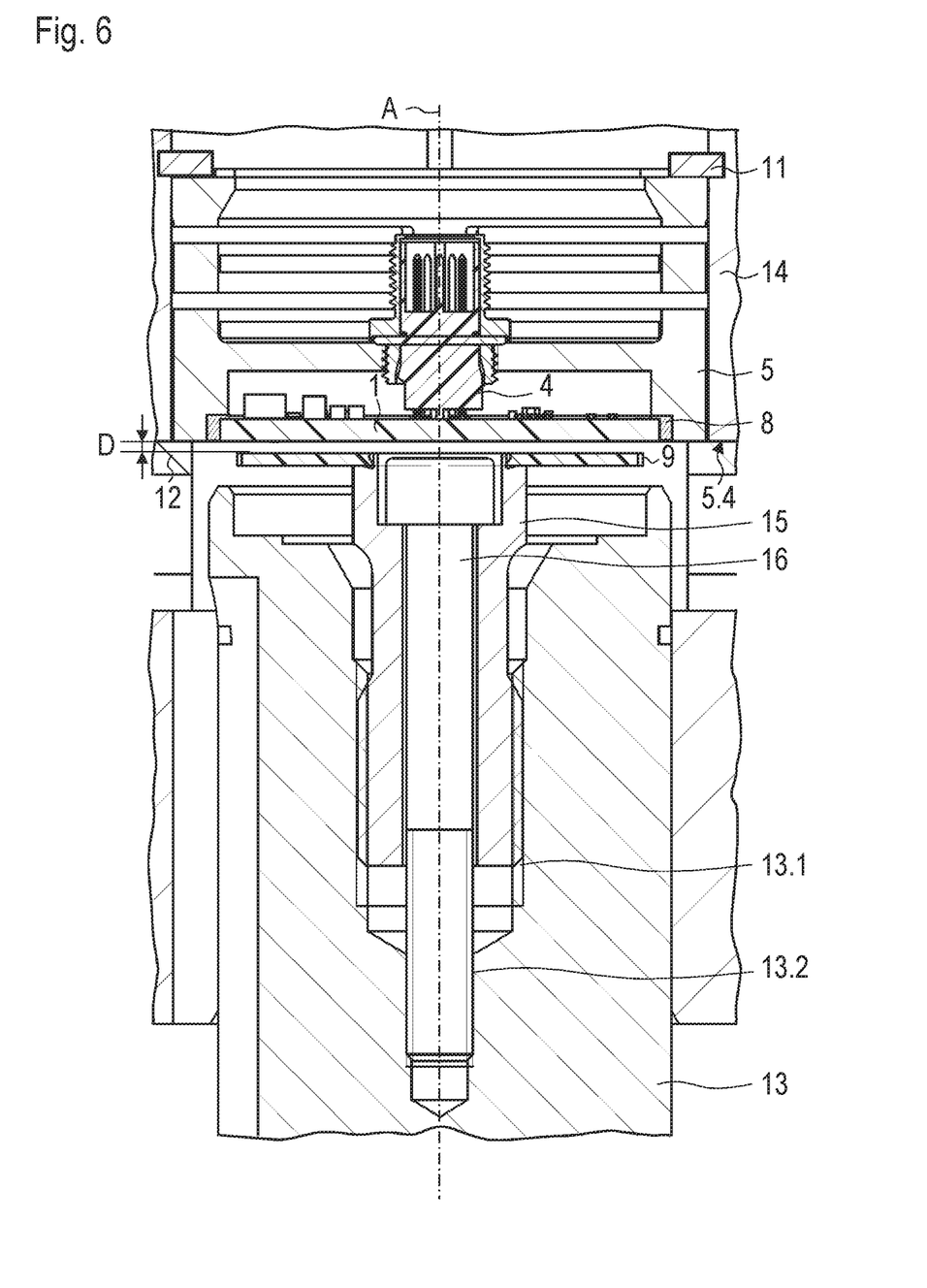
FIG. 6 is a cross-sectional view showing an angle-measuring device with the scanning unit in the mounted condition.

The scanning unit of FIGS. 3 through 5 and an angular scale 9 together form an angle-measuring device as shown in FIG. 6, which is here embodied as an inductive angle-measuring device, and thus is based on an inductive measurement principle. In the exemplary embodiment presented here, angular scale 9 is configured as an annular circuit board on which conductive and non-conductive regions; i.e., regions of different electrical conductivity, are provided in a periodic sequence and at identical graduation steps. Angular scale 9 is non-rotatably connected to a hub 15.

FIG. 6 shows an angle-measuring device which is equipped with the inductive scanning unit and mounted to a motor. The motor is provided in its stator portion with a brake including an armature plate 12. The motor further has a shaft 13 which is rotatable relative to a housing of the motor and relative to armature plate 12. Hub 15 is non-rotatably connected to shaft 13 in such a way that a precisely adjusted air gap having a gap width D is provided between circuit board 1 and angular scale 9. To this end, shaft 13 has a first internal thread 13.1 that can mesh with an external thread of hub 15. This allows hub 15 to be axially displaced relative to shaft 13 through suitable relative rotation between shaft 13 and hub 15. During mounting of hub 15 to shaft 13, initially, hub 15 is screwed into shaft 13, the spacing or gap width D (here, for example, 1.4 mm) between the top edge of housing body 5 and the top surface of angular scale 9 being precisely set using an auxiliary tool. Once this position is reached, a central bolt 16 is turned into a second (smaller) internal thread 13.2 of shaft 13. As a result, the threads of shaft 13 and hub 15 are clamped against one another, whereupon the angular scale 9 carrying the graduation structure is non-rotatably fixed to shaft 13.

After that, the scanning unit, in particular housing body 5, is mounted to the armature plate 12 of the motor. To prevent relative rotation of housing body 5 with respect to armature plate 12, housing body 5 has a key 16 (FIG. 5), which is inserted into a groove of a so-called coil carrier 14 provided on the stator. In addition, housing body 5 is axially preloaded, so that housing body 5 is elastically deformed and the axial gap widths of slots 5.21, 5.22, 5.23, 5.24 are reduced as compared to the relaxed state. In accordance with FIG. 6, a circumferential retaining ring 11 (here a circlip) is installed in order to maintain this axial preload. This ensures that the scanning unit will permanently rest with the stop surface 5.4 of housing body 5 against the armature plate 12 of the motor. Lifting of stop surface 5.4 off the armature plate 12 is impossible, even in the presence of relatively strong vibrations of the motor or upon the occurrence of shocks. Because circuit board 1 is disposed flush with stop surface 5.4, the distance between circuit board 1 and angular scale 9 is equal to the previously set gap width D.

Due to the above-described design, housing body 5 is axially flexible but torsionally and radially rigid.

During operation of the angle-measuring device, angular scale 9 rotates about axis A relative to the scanning unit. The angle-measuring device under consideration has no integral bearing (i.e., no rolling-element bearing or sliding bearing) to achieve relative rotatability, so that, in the exemplary embodiment presented here, it is a bearingless angle-measuring device.

Thus, angular scale 9 and the scanning unit are rotatable relative to each other, the angular scale 9 attached to shaft 13 rotating during operation of the angle-measuring device. Thus, the relative rotational speed between angular scale 9 and the scanning unit is also the rotational speed between shaft 13 and stationary housing body 5. During operation of the angle-measuring device, the non-rotating excitation coils 10 of the stationary scanning unit generate a homogeneous alternating field which is modulated by angular scale 9 as a function of the angular position or angle of rotation of shaft 13. The modulated electromagnetic field generates angle-dependent signals in detector assembly 2, which is also located on the scanning unit. The signals generated by detector assembly 2; i.e., here the receiver windings, are further processed by evaluation electronics 3 so as to determine a relative angular position between the scanning unit and angular scale 9. The connector located in housing body 5; i.e., contacts 4.1 are brought into contact with a connecting cable, which is connected to subsequent electronics.

It can generally be stated that the measurement system also responds to variations in the actual scanning distance D. Scanning distance D contains information as to whether or not the brake disposed in the stator is engaged. This allows the scanning unit to determine the current state of the brake (engaged or released) at any one time.

In the exemplary embodiment presented here, the angle-measuring device is designed according to what is known as "all-round scanning." This means, in particular, that the scanning unit is configured such that angular scale 9 can be scanned by the scanning unit or by detector assembly 2 over almost the entire circumference thereof, thus allowing generation of angle-dependent output signals. Accordingly, the scanning unit scans nearly the entire graduation structure of angular scale 9 to obtain a position signal.

Figure 7:
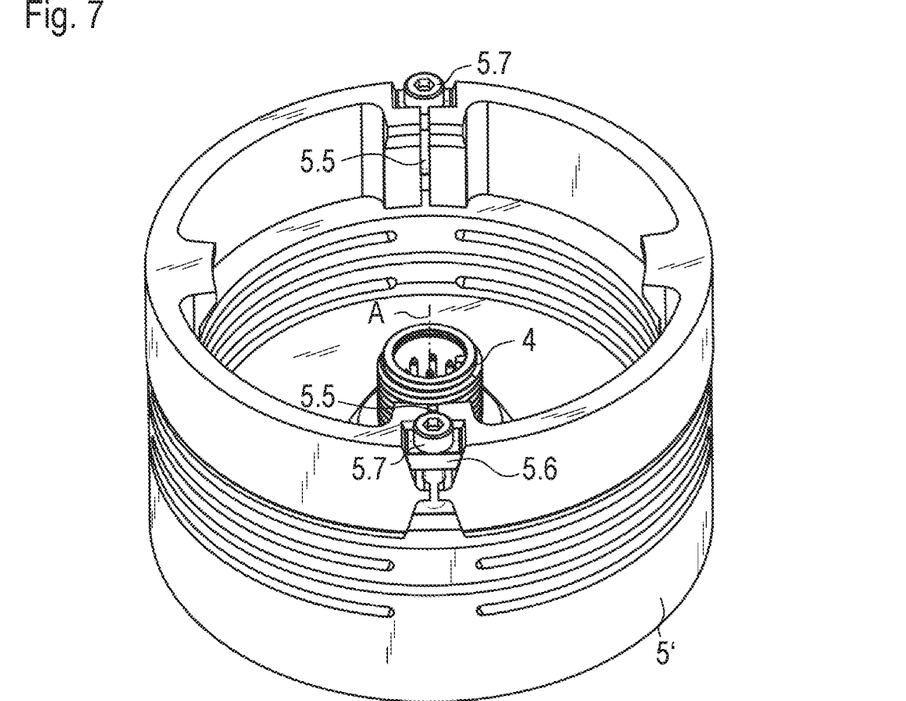
FIG. 7 is a perspective view showing a scanning unit according to a second exemplary embodiment.

FIG. 7 illustrates a second exemplary embodiment, which differs from the first by an alternative configuration of a housing body 5'. This variant allows the scanning unit to be mounted by clamping action. Housing body 5' has two axially extending slits 5.5 as well as wedge-shaped elements 5.6, which can be displaced in the axial direction by clamping screws 5.7. This allows the outer contour of housing body 5' to be urged radially outward in this area, which results in permanent clamping of housing body 5', given suitable dimensioning of the motor housing.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A scanning unit for determining a relative angular position of an angular scale that is rotatable about an axis relative to the scanning unit, the scanning unit comprising:
   a circuit board having a first surface and a second surface;
   a detector assembly which is disposed in a manner that enables scanning of the angular scale when the angular scale is located opposite the first surface of the circuit board;
   evaluation electronics;
   a contact carrier which encloses electrical contacts for creating a plug-and-socket connection, the contact carrier having an outer wall and being mounted on the second surface of the circuit board such that the electrical contacts extend in a direction having an axial component;
   a housing body with an opening having an inner wall, the contact carrier extending into the opening; and
   a first elastic element disposed under radial preload between the inner wall of the opening and the outer wall of the contact carrier, wherein the contact carrier is slidably received in the opening with the first elastic element being radially compressed between the inner wall of the opening and the outer wall of the contact carrier such that the contact carrier is centered by the first elastic element with respect to the inner wall of the opening,
   wherein the circuit board is torsionally rigidly attached to the housing body such that the circuit board is radially spaced from the housing body by a first gap.

2. The scanning unit as recited in claim 1, wherein the first gap is filled with an adhesive.

3. The scanning unit as recited in claim 1, wherein the first elastic element takes the form of an O-ring which is disposed centrally with respect to a center axis of the opening, the center axis being alignable with the axis when the angular scale is positioned relative to the detector assembly.

4. The scanning unit as recited in claim 1, wherein the circuit board is torsionally rigidly attached to the housing body such that the circuit board is axially spaced from the housing body by a second gap.

5. The scanning unit as recited in claim 4, wherein the second gap is filled with an adhesive.

6. The scanning unit as recited in claim 1, wherein the outer wall of the contact carrier is geometrically shaped as a cylindrical shell.

7. The scanning unit as recited in claim 1, wherein the opening has a rotationally symmetric inner surface having an axis of symmetry, the axis of symmetry being alignable with the axis when the angular scale is positioned relative to the detector assembly.

8. The scanning unit as recited in claim 1, wherein the housing body has a bottom, and wherein the circuit board is mounted to the housing body in such a way that the evaluation electronics is located between the bottom and the circuit board.

9. The scanning unit as recited in claim 8, wherein the bottom has a hole in which is mounted a sleeve which receives the contact carrier.

10. The scanning unit as recited in claim 9, wherein a second elastic element is disposed between the sleeve and hole.

11. The scanning unit as recited in claim 10, wherein the second elastic element takes the form of an O-ring.

12. The scanning unit as recited in claim 1, wherein the first elastic element takes the form of an O-ring which is disposed centrally with respect to the axis.

13. The scanning unit as recited in claim 1, wherein the opening has a rotationally symmetric inner surface having an axis of symmetry aligned with the axis.

14. The scanning unit as recited in claim 1, wherein the contact carrier is not screwed to the housing.

15. The scanning unit as recited in claim 1, wherein the housing body includes a stop surface at an end face such that the housing body is configured to rest axially on the stop surface, and wherein the first surface of the circuit board is flush with the stop surface.

16. The scanning unit as recited in claim 15, wherein the first gap is filled with an adhesive, and wherein the adhesive is flush with the first surface of the circuit board and the stop surface of the housing.

17. An angle-measuring device comprising the scanning unit as recited in claim 1 and the angular scale, which is disposed opposite the first surface of the circuit board with a center axis of the opening being aligned with the axis such that the angular scale is scannable by the detector assembly.

* * * * *